July 15, 1969     KARL-HEINZ POHL ET AL     3,455,775
METAL-PLASTIC LAMINATE AND METHOD FOR THE PREPARATION THEREOF
Filed May 26, 1966
INVENTORS K. H. POHL
A. T. SPENCER
BY
ATTORNEY United States Patent Office 3,455,775
Patented July 15, 1969

3,455,775
METAL-PLASTIC LAMINATE AND METHOD FOR THE PREPARATION THEREOF
Karl-Heinz Pohl, Matawan, and Arthur T. Spencer, New Providence, N.J., assignors to Bell Telephone Laboratories, Incorporated, Murray Hill, N.J., a corporation of New York
Continuation-in-part of application Ser. No. 324,700, Nov. 19, 1963. This application May 26, 1966, Ser. No. 553,126
Int. Cl. B32b 15/20, 15/08
U.S. Cl. 161—216
7 Claims

ABSTRACT OF THE DISCLOSURE

A metal-plastic laminate formed by the method of roughening the surfaces of a pair of metallic sheets and subsequently etching said surfaces with a sulfochromate solution and thereafter autogenously bonding the treated surfaces of the sheets together under heat and pressure by inserting a thermoplastic layer therebetween.

---

This application is a continuation-in-part of our copending application, Ser. No. 324,700, filed Nov. 19, 1963, now abandoned which was a continuation-in-part of our copending application, Ser. No. 266,704, filed Mar. 20, 1963, now abandoned.

The present invention relates to a technique for the fabrication of laminated structures and to the resultant laminated structure. More particularly, the present invention relates to aluminum clad thermoplastic laminates which are of particular interest for structural paneling and protective housing applications.

In accordance with the present invention, a technique is described for preparing a laminate in which high strength load bearing aluminum skins, prepared so as to have a high surface energy are bonded autogenously to both sides of a layer of a thermoplastic material under compression at elevated temperatures.

The invention will be more readily understood by reference to the accompanying specification and drawing wherein:

The figure is a cross-sectional view of the laminate of the invention.

The first step of the inventive process involves wiping the outer laminating material or aluminum skins, which are obtained from commercial sources, with a suitable solvent in order to remove excess oils and identification stencils from the surfaces thereof. Acetone is found suitable in this use. Next, the aluminum skins are subjected to vapor degreasing, for example, in trichloroethylene by conventional techniques well known to those skilled in the art.

Following, the cleansed skins are roughened to a depth ranging from 50 microinches to 3 mils by any convenient technique, for example, by grit blasting or acid etching with hydrochloric acid or ferric chloride, so increasing the surface area. Roughening to a depth greater than 3 mils precludes perfect wetting of the surfaces whereas roughening to a depth less than the noted minimum fails to enhance bonding. Next, the skins are etched with a sulfochromate solution in order to obtain a chemically active surface evidencing high surface energies in addition to removing deleterious oxide films.

The sulfochromate step described results in a further roughening and concomitant increase in surface area. The skins so treated are now ready for bonding.

The thermoplastic material employed in the practice of this invention may be any commercially available thermoplastic material and may or may not include fillers, plasticizers, antioxidants, et cetera. Exemplary materials suitable in this use are polyethylene, polypropylene, polystyrene, acrylonitrile-butadiene-styrene copolymers, vinyl, et cetera. The material selected is preferably wiped with a suitable solvent such as acetone, isopropyl alcohol, or trichloroethylene prior to bonding.

The elements of the laminate are next assembled and inserted into a commercial hydraulic press having a heated platen, such platen being preheated to a temperature within the range of 225–600° F. the range being dictated by practical considerations relating to bonding rate, decomposition of the thermoplastic composition, etc. The press is then closed and a pressure of at least 10 pounds per square inch applied. Heating is continued for several minutes, thereby effecting bonding of the aluminum skins to the thermoplastic material and the formation of a laminated structure.

After heating, the assembly is permitted to cool under pressure to a temperature of the order of 200° F., after which the pressure may be released and the assembly removed and permitted to cool to room temperature.

With reference now to the figure, there is shown in cross-sectional view a laminate structure of the invention. Shown in the figure is a structure comprising a pair of aluminum body members 11 and 12 having a sheet of thermoplastic material 13 therebetween.

An example of the present invention is described in detail below. The example is included merely to aid in the understanding of the invention, and variations may be made by one skilled in the art without departing from the spirit and scope of the invention.

Six 5 x 6 inch plates of aluminum having a thickness of 0.025 inch (2024–T3 Alclad sheet), obtained from commercial sources, were wiped with acetone and inserted in a beaker containing the vapors of trichloroethylene. The aluminum plates were permitted to so remain until no further condensation of trichloroethylene occurred, as noted visually.

Next, the cleansed skins were roughened to a depth of approximately one mil by alumina grit blasting. Following, the plates were vapor degreased as described above.

Next, the cleansed aluminum plates were etched with a sulfochromate solution prepared by mixing 127.9 grams of commercial grade sodium dichromate $$(Na_2Cr_2O_7 \cdot 2H_2O)$$

one gallon of tap water and 595 milliliters of technical grade sulfuric acid (95 percent, specific gravity 1.84). The aluminum plates were immersed in the etchant for 10 minutes with continuous agitation at 150° F. Upon retraction from the etching solution, the plates were rinsed with tap water.

Following etching, the surface activity of the aluminum plates was determined by applying a drop of distilled water thereto by means of an eye dropper, the contact angle of the surface being zero as noted by spreading of the drop over a surface area having a diameter within the range of 1–2 centimeters.

Three sheets of thermoplastic material were then selected for use in preparing the laminates, such sheets having the following properties:

TABLE I

| Material | Density (g./cm.³) | Thickness (inch) |
|---|---|---|
| Polyethylene | 0.96 | 0.125 |
| Polypropylene | 0.90 | 0.125 |
| Polystyrene | 1.06 | 0.125 |

The elements of each of the three laminates were then assembled between 0.063 inch aluminum caul plates and inserted into a commercial hydraulic press having a platen previously preheated to 400° F. The press was closed and 200 pounds per square inch pressure applied to machine tool steel stops for 10 minutes. The assembly was then cooled under pressure to a temperature of 200° F. after which pressure was released and the resultant laminates permitted to cool to room temperature.

Each of the resultant 5 x 6 inch laminates was sheared to yield a 2 x 6 inch plate which was used for flexure tests as described above. The results of these tests are set forth in Table II.

TABLE II.—STRENGTH VALUES OF ALUMINUM-THERMOPLASTIC LAMINATES

| Thermo-plastic material | Skin thickness (in.) | Laminate thickness (in.) | Property |
|---|---|---|---|
| Polyethylene | 0.025 | 0.160 | Modules of elasticity (p.s.i.$\times 10^6$), 3.00; yield strength (p.s.i.), 18,000. |
| Polypropylene | 0.025 | 0.160 | Modules of elasticity (p.s.i.$\times 10^6$), 3.31; yield strength (p.s.i.), 28,000. |
| Polystyrene | 0.025 | 0.150 | Modules of elasticity (p.s.i.$\times 10^9$), 4.00; yield strength (p.s.i.), 26,600. |

The laminates produced may be used as panels, sheets, covers, casings, housings or containers for simple or complex electrical devices or as airborne, shipboard or building trades paneling. Further, it will be understood that it may be advantageous in certain uses to prepare laminates of the above type wherein stainless steel or copper alloys are substituted for one or both aluminum plates. It will also be appreciated that antioxidants, fillers, et cetera, may be added to the thermoplastic materials to improve the properties thereof.

What is claimed is:

1. A method for the fabrication of a laminate comprising the steps of successively (a) roughening a pair of aluminum body members, (b) etching said body members with a sulfochromate solution, (c) inserting a sheet of a thermoplastic material between said body members and (d) autogenously bonding said body members to said thermoplastic material by heating the resultant assembly under pressure to a temperature within the range of 225–600° F., thereby forming a laminated structure.

2. A method in accordance with the procedure of claim 1 wherein the said aluminum body members are roughened to a depth ranging from 50 microinches to 3 mils.

3. A method in accordance with claim 1 wherein said thermoplastic material is polyethylene.

4. A method in accordance with claim 1 wherein said thermoplastic material is polypropylene.

5. A method in accordance with claim 1 wherein said thermoplastic material is polystyrene.

6. A laminate prepared in accordance with the procedure of claim 1.

7. A laminate in accordance with claim 6 wherein said thermoplastic material is polyethylene.

References Cited

UNITED STATES PATENTS

| 2,728,703 | 12/1955 | Kiernan et al. | 161—216 XR |
| 2,944,917 | 7/1960 | Cahne | 117—49 |
| 3,115,419 | 12/1963 | Dale | 117—49 |
| 3,192,092 | 6/1965 | Schonhorn | 156—308 |
| 3,211,571 | 10/1965 | Harris et al. | 117—49 |
| 3,269,856 | 8/1966 | Jones | 117—49 XR |
| 3,382,136 | 5/1968 | Bugel et al. | |

FOREIGN PATENTS

| 808,115 | 1/1959 | Great Britain. |

ROBERT F. BURNETT, Primary Examiner

W. A. POWELL, Assistant Examiner